United States Patent
Min et al.

(10) Patent No.: US 11,593,923 B2
(45) Date of Patent: Feb. 28, 2023

(54) IMAGE DATA PROCESSING APPARATUS AND DISPLAY DEVICE FOR CONTROLLING LOCAL DIMMING

(71) Applicant: SILICON WORKS CO., LTD., Daejeon (KR)

(72) Inventors: Pil Jae Min, Daejeon (KR); Kwon Chung, Daejeon (KR)

(73) Assignee: SILICON WORKS CO., LTD., Daejeon (KR)

(*) Notice: Subject to any disclaimer, the term of this patent is extended or adjusted under 35 U.S.C. 154(b) by 288 days.

(21) Appl. No.: 16/950,543

(22) Filed: Nov. 17, 2020

(65) Prior Publication Data

US 2021/0192699 A1 Jun. 24, 2021

(30) Foreign Application Priority Data

Dec. 23, 2019 (KR) .................. 10-2019-0173108

(51) Int. Cl.
| | |
|---|---|
| *G06K 9/00* | (2022.01) |
| *G06T 5/00* | (2006.01) |
| *G06T 5/40* | (2006.01) |
| *G09G 5/00* | (2006.01) |
| *G09G 5/22* | (2006.01) |
| *G06F 1/03* | (2006.01) |

(52) U.S. Cl.
CPC ............. *G06T 5/009* (2013.01); *G06F 1/03* (2013.01); *G06T 5/40* (2013.01); *G09G 5/003* (2013.01); *G09G 5/22* (2013.01); *G06T 2207/10016* (2013.01); *G06T 2207/20021* (2013.01); *G09G 2320/0233* (2013.01); *G09G 2320/0238* (2013.01); *G09G 2320/0626* (2013.01)

(58) Field of Classification Search
CPC .. G06T 5/009; G06T 5/40; G06F 1/03; G09G 5/003
USPC ........................................................ 382/100
See application file for complete search history.

(56) References Cited

U.S. PATENT DOCUMENTS

| | | | |
|---|---|---|---|
| 10,515,595 B2 | 12/2019 | Seong et al. | |
| 2013/0147864 A1* | 6/2013 | Kim | G09G 3/3607 345/88 |
| 2013/0215161 A1* | 8/2013 | Cho | G09G 3/3406 345/694 |
| 2016/0132999 A1* | 5/2016 | Kwon | G06T 5/008 345/593 |
| 2020/0202798 A1* | 6/2020 | Kimbrell | G09G 3/3607 |

FOREIGN PATENT DOCUMENTS

| | | |
|---|---|---|
| KR | 10-2011-0071856 A | 6/2011 |
| KR | 10-1862610 B1 | 5/2018 |

* cited by examiner

*Primary Examiner* — Jonathan M Blancha
(74) *Attorney, Agent, or Firm* — Fenwick & West LLP

(57) ABSTRACT

The present disclosure may improve contrast and deep black by efficiently controlling local dimming in consideration of the ratio of a black image data and the non-uniformity in the area between blocks.

15 Claims, 6 Drawing Sheets

IMAGE DATA PROCESSING APPARATUS AND DISPLAY DEVICE FOR CONTROLLING LOCAL DIMMING

CROSS REFERENCE TO RELATED APPLICATION

This application claims priority from Republic of Korea Patent Application No. 10-2019-0173108, filed on Dec. 23, 2019, which is hereby incorporated by reference in its entirety.

BACKGROUND

1. Field of Technology

The embodiment relates to display technology for improving contrast and deep black color by efficiently controlling local dimming.

2. Description of the Prior Art

Among various components constituting an electronic device, the component having the highest power consumption is a display device. The display device remains in the state of being turned on during the time of providing information to a user, and continues to emit light during the time for which the display device is turned on, which results in higher power consumption in the display device than in other components of the electronic device.

For this reason, manufacturers of electronic devices have continuously conducted research and development to reduce the power consumption of display devices. Typical examples thereof are techniques for switching the display device to a standby mode or turning on only a portion of a display panel.

However, since these techniques are intended to reduce power consumption of a display device by actually constraining a user environment to a certain degree, they inevitably cause some inconvenience to users.

Meanwhile, a technique capable of reducing power consumption of a display device without changing a user environment or while providing a user environment involving little change that is negligible to the user is under development, and a typical example thereof is a local dimming technology.

Local dimming is a technique for partially driving the backlight at different brightness. According to local dimming, a display panel may be divided into several regions, and a plurality of backlight units (BLUs) may emit light to the divided regions at different brightness. Here, the brightness of the backlight may be determined in association with a representative brightness value of the region to which the backlight is emitted. In the conventional method, maximum grey scale values of pixels are obtained from the region to which the backlight is emitted, and the representative brightness value is calculated as an average value of the maximum grey scale values.

However, the conventional method is unable to sufficiently process deep black or real black, which may cause low contrast. The conventional method may be difficult to apply in the case requiring high contrast and complete black, such as corners or edges of a cluster of a vehicle because the contrast is low and it is difficult to implement deep black in the conventional method.

In addition, although the region, to which the backlight is emitted, is required to emphasize brightness or black in a certain environment, the conventional method does not provide flexibility as to whether to enhance the brightness characteristic or the black characteristic in the region.

In addition, since the area of the region, to which the backlight is emitted, is not constant and is not uniform, the brightness may differ between the regions. It is possible to calculate an appropriate dimming value and to implement efficient dimming only by reflecting the non-uniformity in the area to the representative brightness value.

In this regard, the embodiment provides a local dimming technique for providing a degree of freedom as to whether to emphasize black or brightness and considering optical characteristics such as the difference in the area of the region to which backlight is emitted.

SUMMARY

An objective of the embodiment is to provide a local dimming technique for calculating a representative brightness value through analysis of black image data in consideration of the ratio of a black level within one block.

Another objective of the embodiment is to provide a local dimming technique capable of enhancing the brightness characteristic or the black characteristic through a gamma variable in the process of considering the ratio of a black level.

Another objective of the embodiment is to provide a local dimming technique for calculating a representative brightness value in consideration of non-uniformity in the area between blocks of a video image.

To this end, in an aspect, the present disclosure provides an image data processing device comprising: a representative-brightness value calculating circuit calculating circuit configured to analyze original image data on a video image divided into a plurality of blocks and calculate a representative brightness value for one block; a black-image data analyzing circuit configured to generate a first modified representative brightness value by reflecting a ratio of black image data included in the one block to the representative brightness value; a non-uniformity improving circuit configured to generate a second modified representative brightness value by reflecting non-uniformity in the area between the one block and another block to the first modified representative brightness value; a dimming value calculating circuit configured to calculate a dimming value for adjusting the brightness of a backlight for the one block according to the second modified representative brightness value; and a dimming outputting circuit configured to output, to a backlight driving device, a dimming control signal for driving the backlight for the one block according to the dimming value.

In the device, the black-image data analyzing circuit may be configured to adjust the ratio of the black image data depending on a gamma variable and generate the first modified representative brightness value by reflecting the adjusted ratio of the black image data.

In the device, the black-image data analyzing circuit may be configured to apply the gamma variable to the index of the ratio of the black image data, reflect a smaller ratio of the black image data if the gamma variable is greater than 1, and reflect a larger ratio of the black image data if the gamma variable is less than 1.

In the device, the black-image data analyzing circuit may be configured to use a gamma curve in order to change the representative brightness value to the first modified representative brightness value, and the gamma curve may vary depending on the gamma variable.

In the device, the gamma curve is formed using values stored in a lookup table (LUT).

In the device, the ratio of the black image data may be a ratio of the number of pixels displaying black to the total number of pixels included in the one block.

In the device, the non-uniformity improving circuit may be configured to determine the first modified representative brightness value to be a second modified representative brightness value if a variance in the brightness level between all pixels included in the one block satisfies a condition.

In the device, the non-uniformity improving circuit may be configured to reflect one factor to the first modified representative brightness value, thereby generating the second modified representative brightness value, if a variance in the brightness level between all pixels included in the one block satisfies another condition.

In the device, the one factor may be dependent on the area of the one block and is reduced as the area of the block is reduced.

In the device, the one block may be located at an edge or corner of the video image, and the area of the one block may be smaller than the area of another block.

In the device, the one block may become brighter than the other block as the area of the one block becomes smaller than that of the another block.

In the device, the representative-brightness value calculating circuit may be configured to calculate the representative brightness value from data obtained by converting the original image data to a histogram or from cumulated density function (CDF) data obtained by accumulating the data converted to the histogram.

In the device, the black-image data analyzing circuit may be configured to generate the first modified representative brightness value according to the following equation, $$APL\_C1 = APL * \left(1 - \left(\frac{\#\text{black pixels}}{\#\text{pixels}}\right)^\gamma\right)$$

where, "APL" is a representative brightness value, "APL_C1" is a first modified representative brightness value, "#black pixels" is the number of pixels displaying black in a block, "#pixels" is the total number of pixels included in one block, and $\gamma$ is a gamma variable.

In the device, the black-image data analyzing circuit may be configured to use a gamma curve in order to change the representative brightness value to the first modified representative brightness value, and the gamma curve is determined as $$\left(1 - \left(\frac{\#\text{black pixels}}{\#\text{pixels}}\right)^\gamma\right),$$

where "#black pixels" is the number of pixels displaying black in one block, "#pixels" is the total number of pixels in one block, and "$\gamma$" is a gamma variable.

In the device, the non-uniformity improving circuit may be configured to, if a variance in the brightness level between all pixels included in the one block is different from the square of an average of the brightness levels of all the pixels included in the one block, generate the second modified representative brightness value by reflecting the one factor to the first modified representative brightness value.

As described above, according to the embodiment, it is possible to implement high contrast and deep black.

In addition, according to the embodiment, it is possible to provide flexibility between black and brightness by selectively enhancing the black characteristic or the brightness characteristic of a block.

Further, according to the embodiment, it is possible to provide efficient local dimming by considering various optical characteristics such as non-uniformity in the area between blocks.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
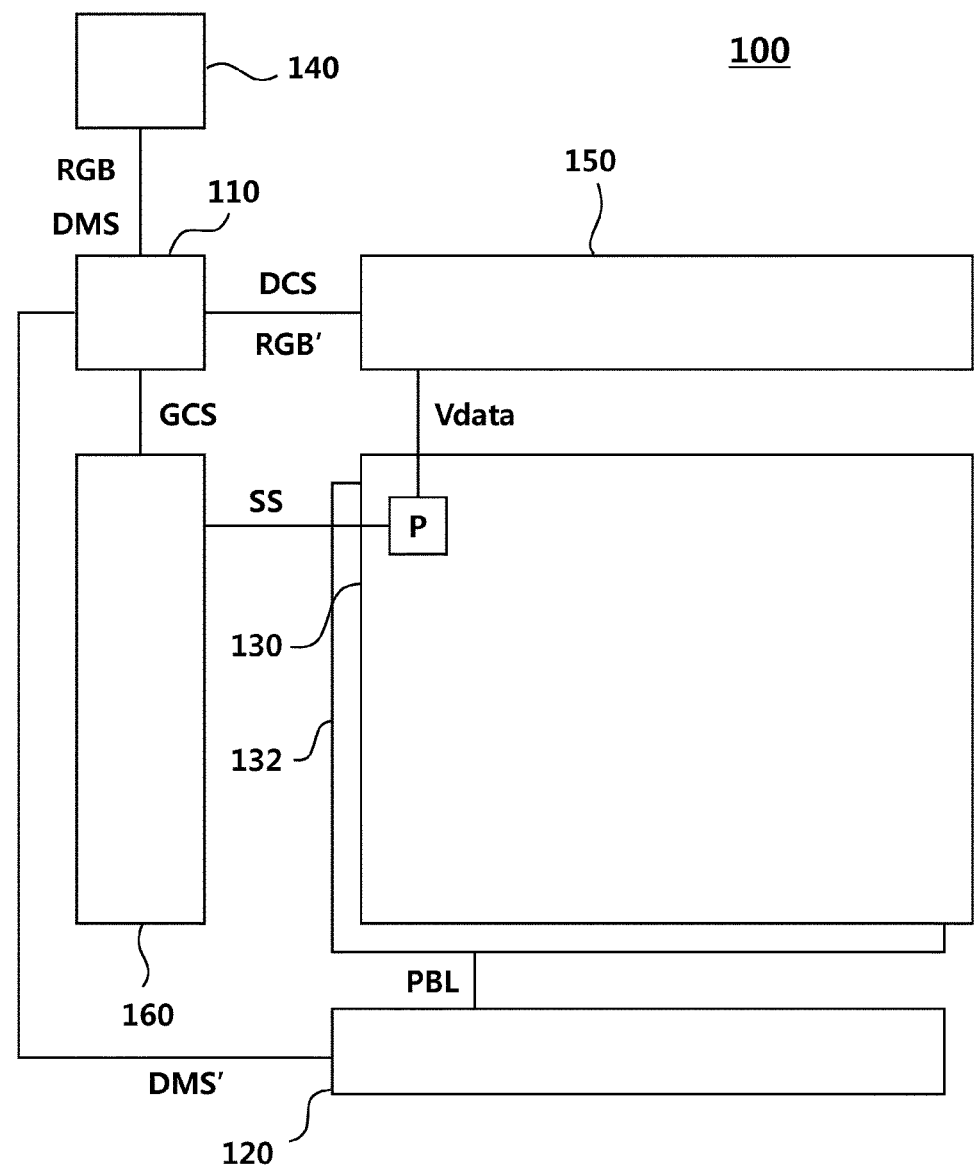
FIG. 1 is a diagram illustrating the configuration of a display device according to an embodiment.

FIG. 1 is a diagram illustrating the configuration of a display device according to an embodiment.

Referring to FIG. 1, the display device 100 may include a host 140, an image data processing device 110, a data driving device 150, a gate driving device 160, a display panel 130, a backlight driving device 120, and the like.

The host 140 may recognize user manipulations, and may generate image data or a dimming control signal according to the user manipulations.

Image data may be converted into various forms in the display device 100. Hereinafter, the image data generated and transmitted by the host 140 will be referred to as "original image data RGB" in order to distinguish the same from the converted image data below, and the image data generated and transmitted by the image data processing device 110 will be referred to as "converted image data RGB'". In addition, a dimming value included in the dimming control signal may be adjusted in the display device 100. Hereinafter, the dimming control signal generated and transmitted by the host 140 will be referred to as an "unadjusted dimming control signal DMS" in order to distinguish the same from the adjusted dimming control signal below, and the dimming control signal generated and transmitted by the image data processing device 110 will be referred to as an "adjusted dimming control signal DMS'".

Referring to the flow of signals, image data is generated by the host 140, is converted by the image data processing device 110, and is then transmitted to the data driving device 150. In addition, the dimming control signal is generated by the host 140, is adjusted by the image data processing device 110, and is then transmitted to the backlight driving device 120.

The image data processing device 110 converts image data and adjusts a dimming control signal.

The image data processing device 110 may analyze original image data RGB for a plurality of pixels P arranged on the display panel 130, and may calculate a representative brightness value for the plurality of pixels P. Since the plurality of pixels P has different brightness values from each other, the image data processing device 110 calculates a representative brightness value that represents the plurality of pixels P. The representative brightness value may be, for example, an average brightness value for the plurality of pixels P. Alternatively, the representative brightness value may be, for example, the brightness value that most frequently appears in the plurality of pixels P, or may be the maximum brightness value thereof. The image data processing device 110 may calculate a representative brightness value for the plurality of pixels P using the method known as a cumulated density function (CDF) or an average pixel level (APL). The representative brightness value may include a value for the CDF or the APL.

The image data processing device 110 may calculate an adjusted dimming value for driving a backlight 132 according to the representative brightness value or the representative brightness value modified according to a predetermined configuration. Here, a dimming value may be understood as a dimming brightness value. The higher the dimming value, the higher the brightness value of the backlight 132. For example, if the dimming value is 100%, the backlight 132 may be driven at the maximum brightness, and if the dimming value is 0%, the backlight 132 may be driven at the minimum brightness, or may be turned off.

The image data processing device 110 may reduce the adjusted dimming value of the backlight 132 as the representative brightness value is reduced. In other words, the image data processing device 110 may reduce the brightness of the backlight 132 as the representative brightness value is reduced.

The image data processing device 110 may convert the original image data RGB in order to compensate for a greyscale value of each pixel according to the adjusted dimming value. The image data processing device 110 may calculate the factor called "gain", may convert the original image data RGB using the gain, and may compensate for the greyscale value. Although the brightness (or illuminance) of the pixel may vary with the adjustment of the dimming value, if the greyscale value displayed by the pixel is adjusted according to the gain so as to correspond to the adjusted dimming value, the pixel may maintain the original brightness. For example, the image data processing device 110 may convert the original image data RGB such that the greyscale value of each pixel is increased as the adjusted dimming value is reduced. Accordingly, the brightness of each pixel may be maintained. Here, the gain may have a characteristic of increasing the greyscale value. The reduction rate of the dimming value and the increase rate of the greyscale value of the pixel may be different from each other, and may be different depending on a pixel level.

The image data processing device 110 may generate an adjusted dimming control signal DMS' according to the adjusted dimming value, and may output the adjusted dimming control signal DMS' to the backlight driving device 120.

Meanwhile, a plurality of pixels P may be arranged in the display panel 130, and data lines and gate lines connected to the plurality of pixels P may be arranged therein. The gate driving device 160 may transmit scan signals (SS) to the gate lines, thereby connecting the respective pixels P to the data lines, and the data driving device 150 may supply a data voltage Vdata corresponding to the image data to the data lines, thereby driving the respective pixels P.

The image data processing device 110 may transmit a gate control signal (GCS) to the gate driving device 160, and may transmit a data control signal (DCS) to the data driving device 150, thereby controlling driving timings for the respective pixels P. In this respect, the gate driving device 160 may be referred to as a "gate driver (GDIC)", the data driving device 150 may be referred to as a "source driver (SDIC)", and the image data processing device 110 may be referred to as a "timing controller (TCON)".

The backlight 132 may be disposed in the background of the display panel 130, and the backlight 132 may be driven by the backlight driving device 120.

The backlight driving device 120 may control the brightness of light sources constituting the backlight 132. The light sources may be provided by, for example, a fluorescent lamp (FL) type or a light-emitting diode (LED) type.

The backlight driving device 120 may control dimming of the backlight 132. For example, the backlight driving device 120 may control the dimming of the backlight 132 using an analog dimming scheme for reducing the amount of power PBL supplied to the backlight 132 while continuously driving the backlight 132. As another example, the backlight driving device 120 may control the dimming of the backlight 132 using a pulse width modulation (PWM) scheme for adjusting the ratio of a turn-on time to a turn-off time while discontinuously driving the backlight 132. According to an embodiment, the PWM scheme may be a method of controlling the brightness of the backlight using the magnitude of voltage charged to a capacitor or the like by a PWM signal.

In the analog dimming scheme, the dimming control signal DMS or DMS' may be in the form of an analog voltage or an analog current, and in the PWM scheme, the dimming control signal DMS or DMS' may be in the form of a PWM signal.

Figure 2:
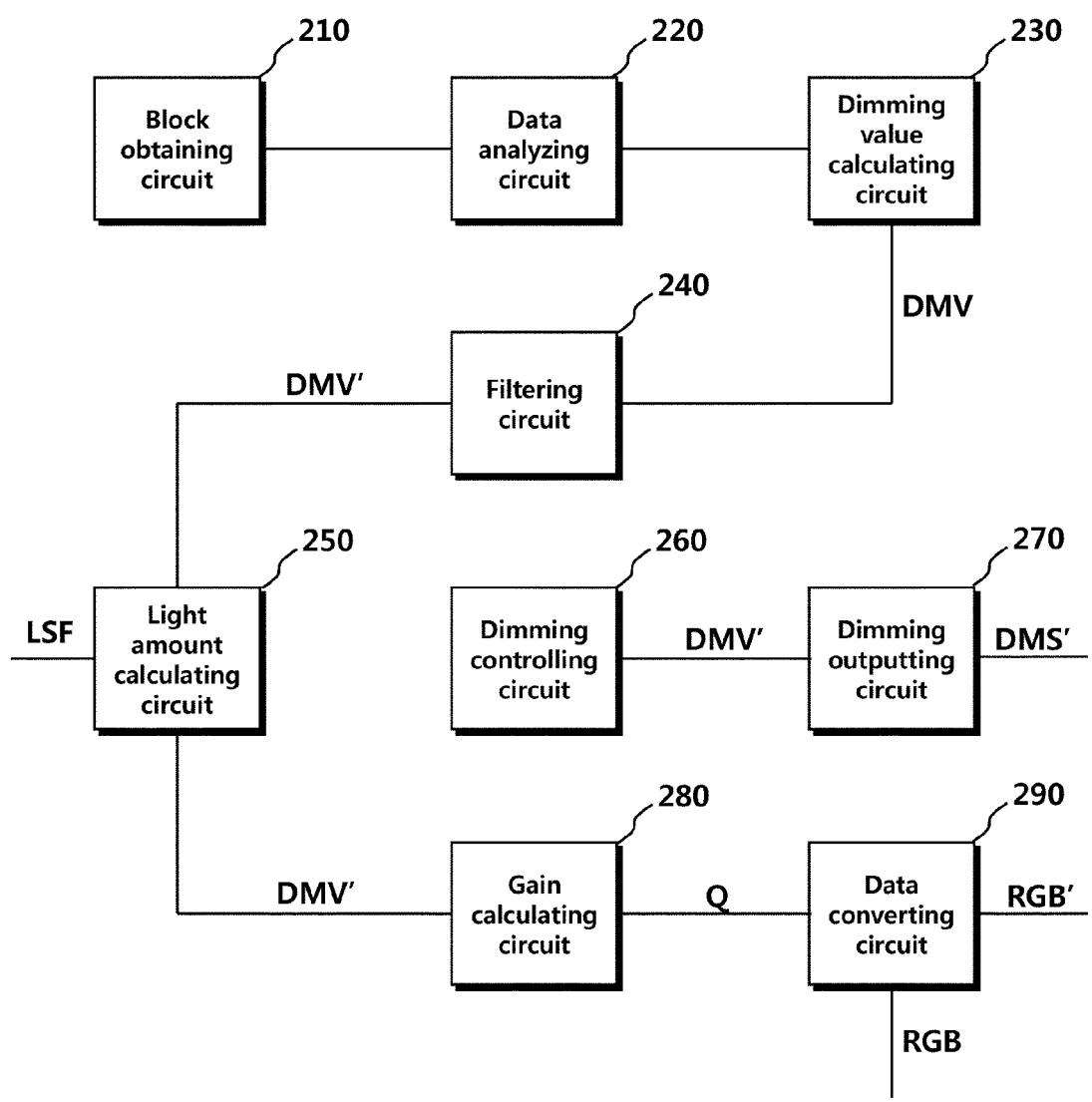
FIG. 2 is a diagram illustrating the configuration of an image data processing device according to an embodiment.

FIG. 2 is a diagram illustrating the configuration of an image data processing device according to an embodiment.

Referring to FIG. 2, the image data processing device 110 may include a block obtaining circuit 210, a data analyzing circuit 220, a dimming value calculating circuit 230, a filtering circuit 240, a light amount calculating circuit 250, a dimming controlling circuit 260, a dimming outputting circuit 270, a gain calculating circuit 280, and a data converting circuit 290.

The block obtaining circuit 210 may receive a video image, and may obtain a plurality of blocks for the video image. The block is a portion of the video image displayed on the display panel 130, and may indicate a region or a section. The block is a unit for emitting light from the backlight, and the backlight may provide different amounts of light to the respective blocks. The backlight may control the dimming such that the respective blocks of the video image have different dimming values.

The data analyzing circuit 220 may analyze original image data RGB on the video image including a plurality of blocks, thereby calculating a representative brightness value for one block. The data analyzing circuit 220 may calculate representative brightness values for original R image data, original G image data, and original B image data in order to generate an appropriate dimming value for local dimming. The representative brightness value may include an average pixel level (APL). The representative brightness value may include an average value, a median value, or a value obtained through a histogram or pooling.

For example, the data analyzing circuit 220 may use the greatest value among the original R image data, the original G image data, and the original B image data as the representative brightness value. Alternatively, the data analyzing circuit 220 may use, as the representative brightness value, the value obtained by applying an appropriate weight to the original R image data, the original G image data, and the original B image data and summing the same. Alternatively, the data analyzing circuit 220 may use the value in which the original image data RGB is mapped to a specific curve as the representative brightness value.

The data analyzing circuit 220 may reflect a ratio of black image data included in the one block to the representative brightness value, thereby modifying the representative brightness value. The data analyzing circuit 220 may use a gamma variable for adjusting the ratio of black image data in order to modify the representative brightness value.

The data analyzing circuit 220 may reflect non-uniformity in the area between the blocks to the modified representative brightness value, thereby remodifying the modified representative brightness value. The respective blocks of the video image displayed on the display panel 130 may have different areas. For example, in the video image displayed on the cluster of a vehicle, the area of a block at the center thereof may be greater than the area of a block at the corner or edge thereof. In addition, the area of a block at the edge may be greater than the area of a block at the corner.

The dimming value calculating circuit 230 may calculate a dimming value. The dimming value calculating circuit 230 may calculate an initial dimming value DMV for each area according to the representative brightness value. The dimming value calculating circuit 230 may calculate an initial dimming value DMV for the representative brightness value using a logarithmic function, an exponential function, or a user function. Here, the dimming value calculating circuit 230 may calculate an initial dimming value DMV according to the remodified representative brightness value obtained by reflecting the ratio of black image data and non-uniformity in the area between blocks.

The filtering circuit 230 may filter a dimming value. The filter 230 may generate a filtered dimming value DMV' by adjusting the initial dimming value DMV through filtering. The filter 230 may perform spatial filtering. The initial dimming value DMV differs between a plurality of areas of the video image, which causes a deviation, so the filter 230 may adjust the deviation. Usually, if the initial dimming value DMV of one block is smaller than the initial dimming value DMV of a neighboring block, the filter 240 may increase the initial dimming value DMV of the one area, thereby reducing the deviation therebetween. Alternatively, if the initial dimming value DMV of the one block is greater than the initial dimming value DMV of the neighboring block, the filter 240 may reduce the initial dimming value DMV of the one block to reduce the deviation therebetween. Accordingly, the filter 240 may prevent the artifacts caused by the deviation.

The filter 240 may use a weighted sum in order to adjust the dimming value. The filter 240 may receive the weighted sum as feedback, and may generate a new weighted sum, thereby performing stable filtering.

In addition, the filter 230 may perform temporal filtering. The filter 230 may adjust the deviation in the dimming value between frames through the temporal filtering. The dimming value may vary between a current frame and a subsequent frame, and the filter 230 may reduce the deviation between the dimming value of the current frame and the dimming value of the subsequent frame. The filter 230 may prevent flickering that occurs when the deviation in the dimming value increases between the frames.

The light amount calculating circuit 250 may calculate the amount of light from the backlight, and may transmit the same to the gain calculating circuit 280 in order to reflect the amount of light to calculation of a gain. The light amount calculating circuit 250 may calculate the amount of light using a light spread function (LSF) and a filtered dimming value DMV'.

The dimming controlling circuit 260 may determine a final dimming value. The dimming controlling circuit 260 may determine the filtered dimming value DMV' to be the final dimming value. The dimming controlling circuit 260 may transmit the filtered dimming value DMV to the dimming outputting circuit 270. If there are conditions to be reflected to determine a dimming value, the dimming controlling circuit 260 may adjust the filtered dimming value DMV' by reflecting the conditions, and may determine the adjusted and filtered dimming value DMV to be the final dimming value.

The dimming outputting circuit 270 may convert a dimming value into a dimming control signal, and may output the same to the backlight driving device. The dimming outputting circuit 270 may convert a filtered dimming value DMV' into an adjusted dimming control signal DMS'. The input dimming control signal and the adjusted dimming control signal DMS' are preferably signals in the same type. To this end, the dimming outputting circuit 270 may control the cycle or frequency of the dimming control signal DMS' so as to match the cycle or frequency of the input dimming control signal.

The gain calculating circuit 280 may calculate a gain Q for compensating for the original image data RGB according to a dimming value. The gain calculating circuit 280 may receive a filtered dimming value DMV' from the light amount calculating circuit 250, and may calculate a gain Q for compensating for the original image data RGB according to the filtered dimming value DMV'. Specifically, despite the greyscale value of the changed original image data RGB and the filtered dimming value DMV', the gain Q may be a factor necessary in order for the pixels to realize the same brightness.

The data converting circuit 290 may generate image data RGB' converted from the original image data RGB using the gain Q. The data converting circuit 290 may generate converted image data RGB' by applying the finally determined gain Q to R image data, G image data, and B image data.

Figure 3:
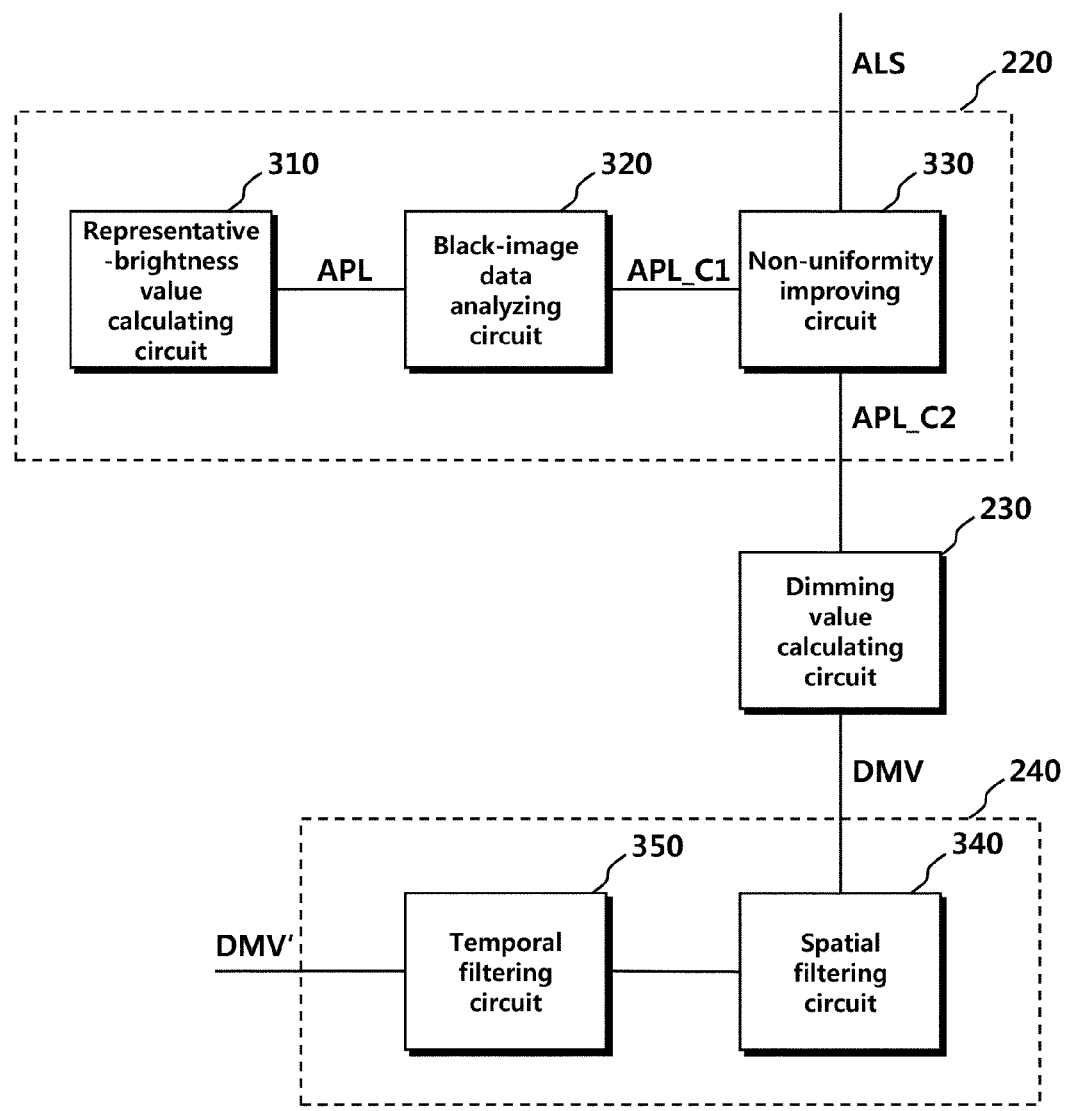
FIG. 3 is a diagram illustrating the configuration of an image data processing device according to an embodiment.

FIG. 3 is a diagram illustrating the configuration of an image data processing device according to an embodiment.

Referring to FIG. 3, the data analyzing circuit 220 may include a representative-brightness value calculating circuit 310, a black-image data analyzing circuit 320, and the non-uniformity improving circuit 330.

The representative-brightness value calculating circuit 310 may calculate a representative brightness value for one block of a video image displayed on the display panel 130. The representative-brightness value calculating circuit 310 may use an APL as the representative brightness value. The representative-brightness value calculating circuit 310 may calculate an APL by averaging the maximum greyscale values of pixels in one block.

The representative-brightness value calculating circuit 310 may generate histogram data by converting the original image data RGB into a histogram, or may generate cumulated density function (CDF) data by accumulating the histogram data. The representative-brightness value calculating circuit 310 may calculate an APL according to the histogram data or the cumulated density function (CDF) data.

The black-image data analyzing circuit 320 may generate a modified representative brightness value by reflecting the ratio of black image data to the representative brightness value. For example, the black-image data analyzing circuit 320 may generate a modified APL APL_C1 by reflecting the ratio of black image data to the APL.

The black-image data analyzing circuit 320 may generate a modified representative brightness value by adjusting a gamma variable for adjusting the ratio of black image data. Here, the ratio of black image data may include the ratio of the number of pixels displaying black to the total number of pixels included in one block.

The black-image data analyzing circuit 320 may increase or reduce the modified representative brightness value depending on whether the value of a gamma variable is greater or less than a specific value.

The black-image data analyzing circuit 320 may use a gamma curve for the modified representative brightness value. The gamma curve may have different forms depending on the gamma variable. In addition, the gamma curve may be formed using the values stored in a lookup table LUT.

The non-uniformity improving circuit 330 may generate a remodified representative brightness value by reflecting non-uniformity in the area between one block and another block to the modified representative brightness value. For example, the non-uniformity improving circuit 330 may generate a remodified APL APL_C2 by reflecting the ratio of black image data to the modified APL APL_C1. The non-uniformity improving circuit 330 may use illuminance data ALS including illuminance information in order to generate the remodified APL APL_C2.

If the variance in the level between all pixels included in one block satisfies a condition, the non-uniformity improving circuit 330 may determine the modified representative brightness value as the remodified representative brightness value. That is, the non-uniformity improving circuit 330 may not reflect any factor to the modified representative brightness value. Here, the level of the pixel may include a grey scale value of the pixel.

The non-uniformity improving circuit 330 may generate a remodified representative brightness value by reflecting non-uniformity in the area between one block and another block to the modified representative brightness value. If the variance in the level between all pixels included in one block satisfies a condition, the non-uniformity improving circuit 330 may reflect one factor to the modified representative brightness value, and may determine a result thereof to be the remodified representative brightness value. The one factor will be described later.

If the non-uniformity improving circuit 330 transmits the remodified APL APL_C2 to the dimming value calculating circuit 230, the dimming value calculating circuit 230 may generate an initial dimming value DMV, and may transmit the same to the filtering circuit 240.

The filtering circuit 240 may include the spatial filtering circuit 340 and the temporal filtering circuit 350. The filtering circuit 240 may filter the initial dimming value DMV, and may then generate and output a filtered dimming value DMV'.

The spatial filtering circuit 340 may adjust the deviations in the dimming value between a plurality of blocks of the video image so as to have uniform brightness therein.

The temporal filtering circuit 350 may filter the dimming value so that the dimming value changes smoothly to a target dimming value. The temporal filtering circuit 350 may smoothly change the dimming value in order to prevent flickering that occurs when there is a large deviation between the dimming value of one frame and the dimming value of a previous frame.

Figure 4:
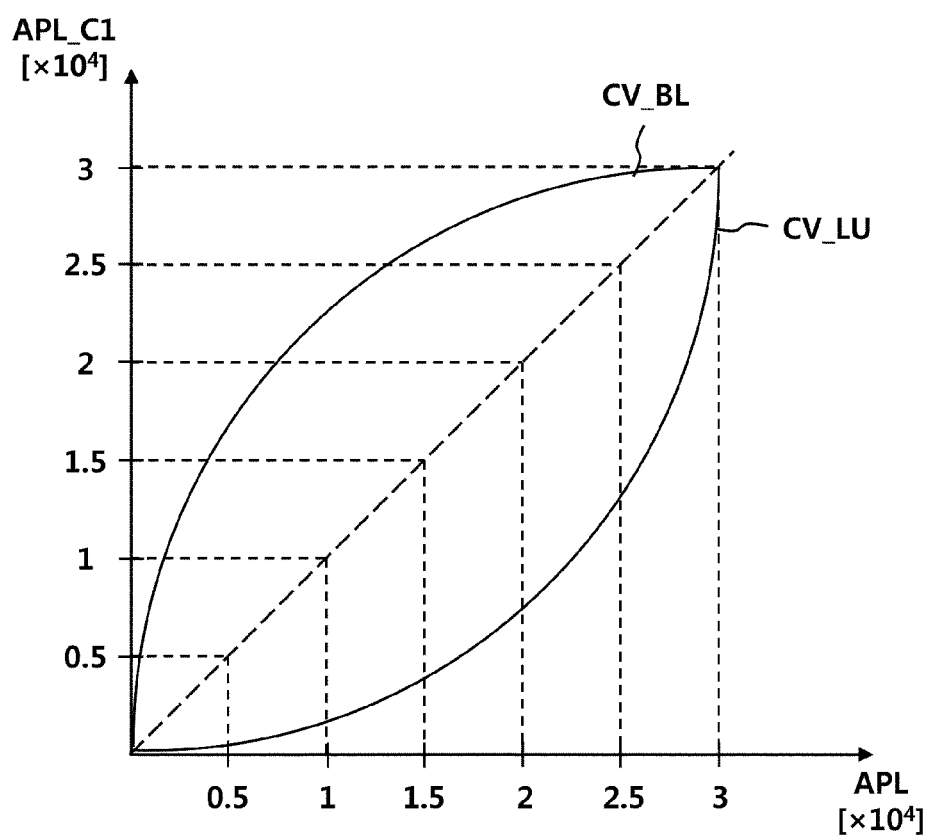
FIG. 4 is a diagram illustrating an example of a gamma curve for explaining reflection of the ratio of black image data to a representative brightness value according to an embodiment.

FIG. 4 is a diagram illustrating an example of a gamma curve for explaining reflection of the ratio of black image data to a representative brightness value according to an embodiment.

Referring to FIG. 4, the black-image data analyzing circuit of the data analyzing circuit may use a gamma variable and a gamma curve according to the gamma variable in order to generate a modified representative brightness value reflecting the ratio of black image data.

The black-image data analyzing circuit may modify the representative brightness value by reflecting the ratio of black image data to the representative brightness value through Equation 1 below, which includes a gamma variable. An APL is used as the representative brightness value, and this process may be performed independently for each block.

$$APL\_C1 = APL * (1(\#black\ pixels/\#pixels)^{\gamma}) \quad [\text{Equation 1}]$$

Here, "APL" may denote the representative brightness value, and "APL_C1" may denote the modified representative brightness value, respectively. The ratio of the number of pixels displaying black (#black pixels) to the total number of pixels included in any one block (#pixels) may indicate the ratio of black image data. The gamma variable ($\gamma$) may adjust this ratio.

If the gamma variable is less than 1, the modified representative brightness value may be reduced, and if the gamma variable is greater than 1, the modified representative brightness value may be increased. The value of the gamma variable may be determined by a user configuration. If the user configures the gamma variable to be less than 1 in order to enhance the black characteristic of one block, the black-image data analyzing circuit may emphasize the black characteristic by reducing the modified representative brightness value. Alternatively, if the user configures the gamma variable to be greater than 1 in order to enhance the brightness characteristic of one block, the black-image data analyzing circuit may emphasize the brightness characteristic by increasing the modified representative brightness value.

The black-image data analyzing circuit may use a gamma curve according to the gamma variable in order to generate a modified representative brightness value. The gamma curve may be formed using the values stored in a lookup table.

For example, if the gamma variable is less than 1, so if the black characteristic is emphasized, the black-image data analyzing circuit may use a black gamma curve CV_BL. The black-image data analyzing circuit may generate a modified APL APL_C1 by allowing the APL to correspond to the black gamma curve CV_BL. Alternatively, if the gamma variable is greater than 1, so if the brightness characteristic is emphasized, the black-image data analyzing circuit may use a brightness gamma curve CV_LU. The black-image data analyzing circuit may generate a modified APL APL_C1 by allowing the APL to correspond to the brightness gamma curve CV_LU.

Depending on whether the user emphasizes the black characteristic or the brightness characteristic, the gamma variable and the gamma curve according thereto may be adjusted, and the modified representative brightness value may also be adjusted differently. Accordingly, the control flexibility and the degree of freedom between the black characteristic and the brightness characteristic may be increased.

Figure 5:
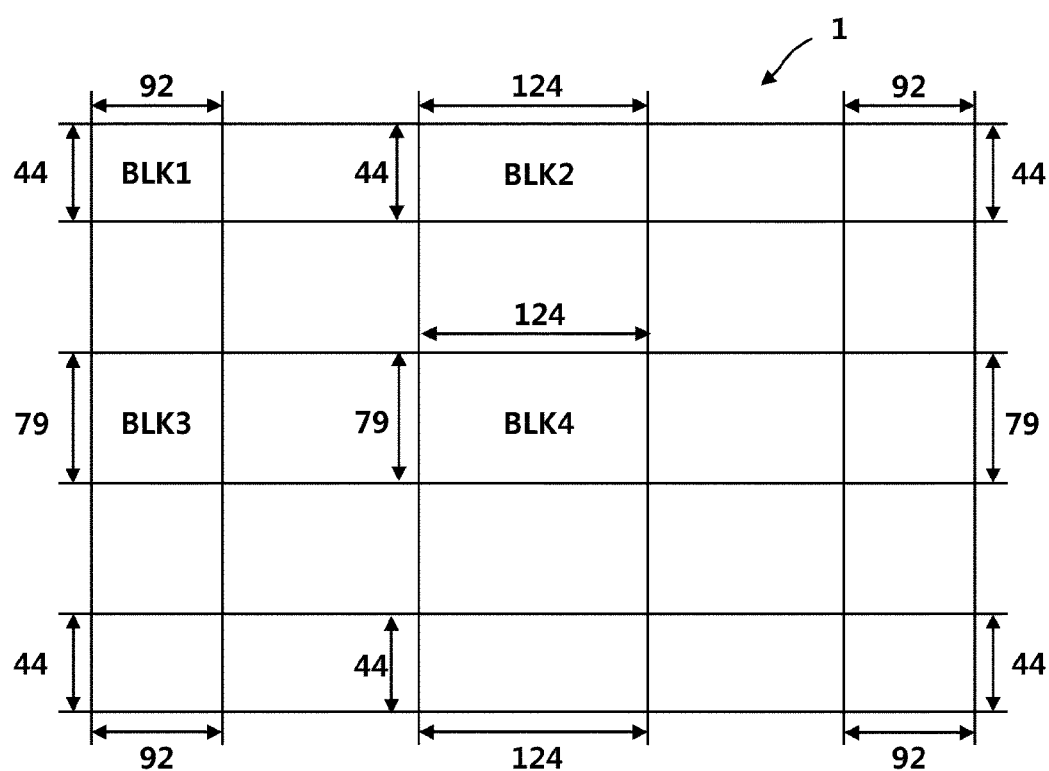
FIG. 5 is a diagram illustrating an example of a gamma curve for explaining reflection of the characteristics of a black having non-uniformity in the area to a representative brightness value according to an embodiment.

FIG. 5 is a diagram illustrating an example of a gamma curve for explaining reflection of the characteristics of a black having non-uniformity in the area to a representative brightness value according to an embodiment.

The non-uniformity improving circuit of the data analyzing circuit may use one factor in order to reflect the brightness characteristic that appears due to non-uniformity in the area between blocks to the representative brightness value. Here, non-uniformity in the area between the blocks may be further reflected to the modified representative brightness value, which has already reflected the ratio of black image data.

FIG. 5 illustrates blocks of a video image 1 having non-uniformity in the area.

The video image 1 may include a plurality of blocks having different areas from each other. For example, the video image 1 displayed on the cluster of a vehicle may include blocks having different areas. The video image 1 may include four types of blocks depending on the area. Here, the unit of a size may be mm or may be omitted. The size of an area may be calculated by multiplying a horizontal length by a vertical length. A first block BLK1 may have a first size of 4048 (=92×44), a second block BLK2 may have a second size of 5456 (=124×44), a third block BLK3 may have a third size of 7268 (=92×79), and a fourth block BLK4 may have a fourth size of 9796 (=124×44), respectively.

A plurality of blocks may have different areas depending on the positions thereof (for example, near the center, at the corner and edge, or the like). For example, the first block BLK1 may be disposed at the corner, and may have the smallest size. The fourth block BLK4 may be disposed near the center, and may have the largest size. The second block BLK2 and the third block BLK3 may be disposed at the edges, and may have the intermediate size, which is greater than the first block BLK1 and less than the fourth block BLK4. Although both the second block BLK2 and the third block BLK3 are disposed at the edges, the area of the second block BLK2 may be smaller than that of the third block BLK3 depending on the positions thereof.

In general, the fourth block BLK4 disposed near the center may have higher brightness, and the second block BLK2 and the third block BLK3 disposed at the corner and the edge may have lower brightness. In order to compensate for non-uniformity in the brightness above, a physical method for increasing the brightness in the second block BLK2 and the third block BLK3 disposed at the corner and the edge has been used. However, as a result of the method, the contrast between the second block BLK2 and the third block BLK3 disposed at the corner and the edge may be reduced. Accordingly, the brightness may differ between the first to fourth blocks BLK1 to BLK 4. Due to the above differences in the brightness, the second block BLK2 and the third block BLK3 disposed at the corner and the edge may display brighter black than other blocks.

In order to correct the difference in the brightness between the blocks due to non-uniformity in the area thereof, the non-uniformity improving circuit of the data analyzing circuit may modify the representative brightness value. The non-uniformity improving circuit may reflect non-uniformity in the area between blocks to the modified representative brightness value that has reflected the ratio of black image data.

For example, the non-uniformity improving circuit may use a variance in order to generate a remodified representative brightness value from the modified representative brightness value. The non-uniformity improving circuit may obtain a variance using Equation 2 below, and may calculate a remodified representative brightness value. An APL may be used as the representative brightness value.

$$VAR_{BLK} = \frac{1}{n}\sum_{i=0}^{n} x_i^2 - avg^2 \qquad \text{[Equation 2]}$$

if $VAR_{BLK} = 0$ : APL_C2 = APL_C1 if $VAR_{BLK} \neq 0$ : APL_C2 = APL_C1 · G $$G\_BLK1 = \frac{\#\text{pixels of } BLK1}{\#\text{pixels of } BLK4}$$

$$G\_BLK2 = \frac{\#\text{pixels of } BLK2}{\#\text{pixels of } BLK4}$$

$$G\_BLK3 = \frac{\#\text{pixels of } BLK3}{\#\text{pixels of } BLK4}$$

$$G\_BLK4 = \frac{\#\text{pixels of } BLK4}{\#\text{pixels of } BLK4}$$

Here, "VARBLK" may indicate a variance, "n" may be the total number of pixels in one block, "$x_i$" may be brightness data (e.g., a brightness or a greyscale value) of each pixel, and "avg" may be the average of the brightness data for all pixels in one block. Hence, if the variance is zero, the non-uniformity improving circuit may regard the modified representative brightness value as a remodified representative brightness value. If the variance is not zero, the non-uniformity improving circuit may calculate a remodified representative brightness value by reflecting one factor G to the modified representative brightness value.

"G" may be a factor for correcting non-uniformity in the area between the blocks. "G" may vary depending on the area of each block. In addition, illuminance data ALS may be further used to obtain "G". G_BLK1, G_BLK2, G_BLK3, and G_BLK4 may be factors for modifying the respective representative brightness values in the first to fourth blocks BLK1 to BLK4. Each factor may be the ratio of the area of a corresponding block to the area of the largest block. For example, a first factor G_BLK1 may be the ratio of the number of pixels in the first block (#pixels of BLK1) to the number of pixels in the fourth block (#pixels of BLK4). A fourth factor G_BLK4 may be the ratio of the number of pixels in the fourth block (#pixels of BLK4) to the number of pixels in the fourth block (#pixels of BLK4). The factor may increase as going from the first factor G_BLK1 to the fourth factor G_BLK4.

The non-uniformity improving circuit may reflect a corresponding factor to the modified representative brightness value (e.g., the modified APL APL_C1) in order to obtain a remodified representative brightness value (e.g., the remodified APL APL_C2) of a corresponding block. Accordingly, the remodified representative brightness value of the first block BLK1 at the corner may be the smallest, the remodified representative brightness value of the fourth block BLK4 near the center may be the largest, and the remodified representative brightness values of the second block BLK2 and the third block BLK3 at the edges may have an intermediate size.

Figure 6:
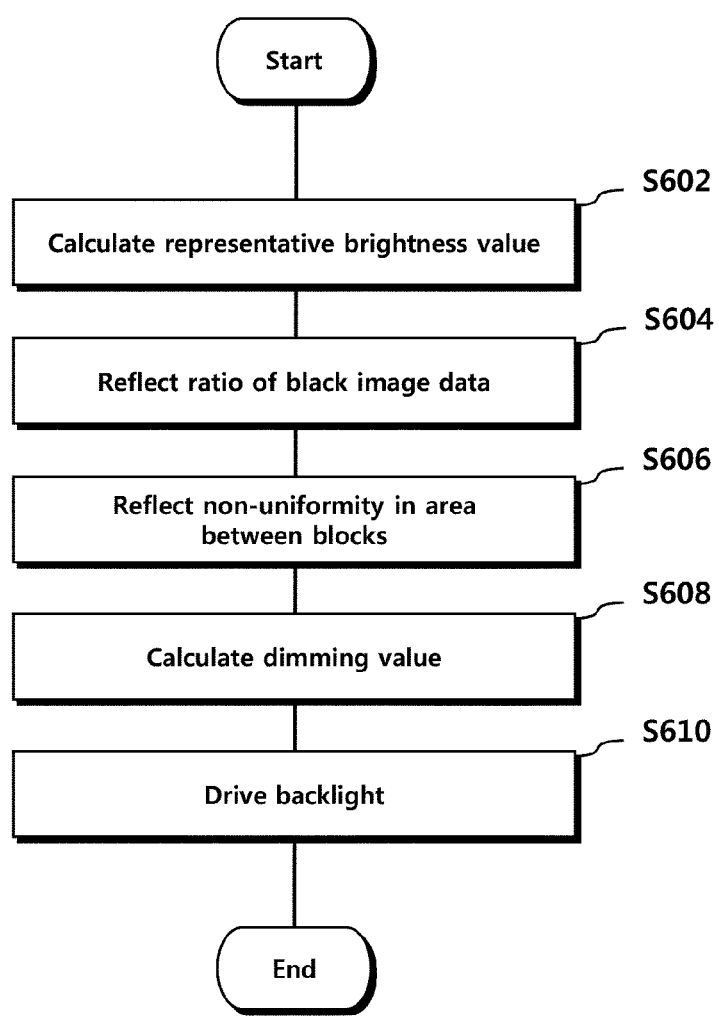
FIG. 6 is a flowchart for local dimming of an image data processing device according to an embodiment.

FIG. 6 is a flowchart for local dimming of an image data processing device according to an embodiment.

Referring to FIG. 6, the image data processing device may receive a video image including a plurality of regions, may analyze original image data on the video image, and may calculate a representative brightness value of one block (step S602).

The image data processing device may convert original image data into a histogram in order to calculate a representative brightness value. In addition, the image data processing device may use CDF data. For example, if original image data has 8 bits, the image data processing device may recognize the frequencies of values from 0 to 255, thereby producing histogram data. In addition, the image data processing device may produce CDF data by accumulating the frequencies of values. The image data processing device may calculate an APL from the CDF data.

The image data processing device may generate a first modified representative brightness value by reflecting the ratio of black image data included in one block to the representative brightness value (step S604).

The image data processing device may receive the value of a gamma variable from the outside, and may adjust the ratio of black image data according to the value. If the value of a gamma variable is less than 1, the image data processing device may reduce the modified representative brightness value, thereby enhancing the black characteristic thereof. If the value of a gamma variable is greater than 1, the image data processing device may increase the modified representative brightness value, thereby enhancing the brightness characteristic thereof.

The image data processing device may generate a second modified representative brightness value by reflecting non-uniformity in the area between one block and another block to the first modified representative brightness value (step S606).

The image data processing device may calculate a dimming value for adjusting the brightness of a backlight according to the second modified representative brightness value (step S608).

The image data processing device may generate a dimming control signal according to the dimming value, and may output the dimming control signal to the backlight driving device (step S610).

What is claimed is:

1. An image data processing device comprising:
    a representative-brightness value calculating circuit configured to analyze original image data on a video image divided into a plurality of blocks and to calculate a representative brightness value for one block from the plurality of blocks;
    a black-image data analyzing circuit configured to generate a first modified representative brightness value by reflecting a ratio of black image data included in the one block to the representative brightness value;
    a non-uniformity improving circuit configured to generate a second modified representative brightness value by reflecting non-uniformity in an area between the one block and another block to the first modified representative brightness value;
    a dimming value calculating circuit configured to calculate a dimming value for adjusting the brightness of a backlight for the one block according to the second modified representative brightness value; and
    a dimming outputting circuit configured to output, to a backlight driving device, a dimming control signal for driving the backlight for the one block according to the dimming value.

2. The image data processing device of claim 1, wherein the black-image data analyzing circuit is configured to adjust the ratio of the black image data depending on a gamma variable and to generate the first modified representative brightness value by reflecting the adjusted ratio of the black image data.

3. The image data processing device of claim 2, wherein the black-image data analyzing circuit is configured to apply the gamma variable as an index to the ratio of the black image data, to reflect a smaller ratio of the black image data if the gamma variable is greater than 1, and to reflect a larger ratio of the black image data if the gamma variable is less than 1.

4. The image data processing device of claim 2, wherein the black-image data analyzing circuit is configured to use a gamma curve in order to change the representative brightness value to the first modified representative brightness value, wherein the gamma curve varies depending on the gamma variable.

5. The image data processing device of claim 4, wherein the gamma curve is formed using values stored in a lookup table (LUT).

6. The image data processing device of claim 2, wherein the black-image data analyzing circuit is configured to generate the first modified representative brightness value according to the following equation, $$APL\_C1 = APL * (1(\#black\ pixels/\#pixels)^\gamma)$$

wherein, APL is a representative brightness value, APL_C1 is a first modified representative brightness value, #black pixels is a number of pixels displaying black in a block, #pixels is a total number of pixels included in one block, and γ is a gamma variable.

7. The image data processing device of claim 2, wherein the black-image data analyzing circuit is configured to use a gamma curve in order to change the representative brightness value to the first modified representative brightness value, and the gamma curve is determined as $(1-(\#black\ pixels/\#pixels)^\gamma)$, wherein "#black pixels" is a number of pixels displaying black in one block, #pixels is a total number of pixels in the one block, and γ is a gamma variable.

8. The image data processing device of claim 1, wherein the ratio of the black image data is a ratio of a number of pixels displaying black to a total number of pixels included in the one block.

9. The image data processing device of claim 1, wherein the non-uniformity improving circuit is configured to determine the first modified representative brightness value to be a second modified representative brightness value if a variance in the brightness level between all pixels included in the one block satisfies a condition.

10. The image data processing device of claim 1, wherein the non-uniformity improving circuit is configured to reflect one factor to the first modified representative brightness value, thereby generating the second modified representative brightness value, if a variance in the brightness level between all pixels included in the one block satisfies another condition.

11. The image data processing device of claim 10, wherein the one factor is dependent on the area of the one block and is reduced as the area of the block is reduced.

12. The image data processing device of claim 10, wherein the non-uniformity improving circuit is configured to, if a variance in the brightness level between all pixels included in the one block is different from a square of an average of the brightness levels of all the pixels included in the one block, generate the second modified representative brightness value by reflecting the one factor to the first modified representative brightness value.

13. The image data processing device of claim 1, wherein the one block is located at an edge or corner of the video image, and the area of the one block is smaller than the area of another block.

14. The image data processing device of claim 13, wherein the one block becomes brighter than the other block as the area of the one block becomes smaller than that of the other block.

15. The image data processing device of claim 1, wherein the representative-brightness value calculating circuit is configured to calculate the representative brightness value from data obtained by converting the original image data to a histogram or from cumulated density function (CDF) data obtained by accumulating the data converted to the histogram.

* * * * *